(12) United States Patent
Turunen et al.

(10) Patent No.: US 8,526,520 B2
(45) Date of Patent: Sep. 3, 2013

(54) CYCLOSTATIONARY SIGNAL DETECTION IN THE ANGULAR DOMAIN FOR COMMUNICATION SYSTEMS

(75) Inventors: Vesa Turunen, Espoo (FI); Marko Kosunen, Helsinki (FI)

(73) Assignee: Nokia Corporation, Espoo (FI)

( * ) Notice: Subject to any disclaimer, the term of this patent is extended or adjusted under 35 U.S.C. 154(b) by 361 days.

(21) Appl. No.: 13/007,939

(22) Filed: Jan. 17, 2011

(65) Prior Publication Data

US 2012/0183030 A1   Jul. 19, 2012

(51) Int. Cl.
*H04L 27/28* (2006.01)

(52) U.S. Cl.
USPC ........... 375/260; 375/259; 375/224; 375/316; 375/354

(58) Field of Classification Search
USPC .......................... 375/224, 259, 260, 316, 354
See application file for complete search history.

(56) References Cited

U.S. PATENT DOCUMENTS

| | | | |
|---|---|---|---|
| 2008/0014880 A1* | 1/2008 | Hyon et al. | 455/161.1 |
| 2008/0192864 A1* | 8/2008 | Szajnowski | 375/340 |
| 2009/0102981 A1* | 4/2009 | Mody | 348/732 |
| 2009/0262868 A1* | 10/2009 | Mohammed et al. | 375/340 |
| 2010/0023990 A1* | 1/2010 | Chen et al. | 725/118 |
| 2010/0054352 A1 | 3/2010 | Huttunen et al. | |
| 2010/0086074 A1* | 4/2010 | Chen et al. | 375/267 |
| 2010/0134699 A1* | 6/2010 | Gao et al. | 348/731 |
| 2010/0248760 A1* | 9/2010 | Li et al. | 455/500 |
| 2010/0266002 A1* | 10/2010 | Du et al. | 375/224 |
| 2011/0085612 A1* | 4/2011 | Muraoka et al. | 375/260 |
| 2011/0122976 A1* | 5/2011 | Lei et al. | 375/340 |
| 2011/0169965 A1* | 7/2011 | Kim et al. | 348/181 |
| 2011/0183621 A1* | 7/2011 | Quan et al. | 455/42 |

OTHER PUBLICATIONS

Cabric, D. B., et al., "Cognitive Radios: System Design Perspective," Electrical Engineering and Computer Sciences, University of California at Berkeley, Technical Report No. UCB/EECS-2007-156, http://www.eecs.berkeley.edu/Pubs/TechRpts/2007/EECS-2007-156.html, Dec. 17, 2007, 168 pages.

Dandawatá, A. V., et al. "Statistical Tests for Presence of Cyclostationarity," IEEE Trans. Signal Processing, vol. 42, No. 9, Sep. 1994, pp. 2355-2369.

Gardner, W. A., "Spectral Correlation of Modulated Signals: Part I—Analog Modulation," IEEE Transactions on Communications, vol. Com-35, No. 6, Jun. 1987, pp. 584-594.

(Continued)

*Primary Examiner* — Kenneth Lam
(74) *Attorney, Agent, or Firm* — Squire Sanders (US) LLP

(57) ABSTRACT

Apparatuses and methods for providing efficient spectrum sensing and signal detection using cyclostationary based spectrum sensing algorithms. A method embodiment is provided, comprising: receiving input samples of a signal having expected predetermined properties; transforming the input samples to angular form and obtaining data samples corresponding to at least one angle vector; performing a cyclostationarity test on the at least one angle vector, the cyclostationarity test being done entirely in an angular domain; wherein the cyclostationarity test comprises testing the at least one angle vector for a non-uniform distribution, the non-uniform distribution of the at least one angle vector indicating cyclostationarity in the input samples; and where cyclostationarity in the input samples is determined, refraining from transmitting radio frequency signals over an air interface at a frequency corresponding to the received signal. Apparatuses for implementing the methods are also disclosed.

20 Claims, 12 Drawing Sheets

(56) References Cited

OTHER PUBLICATIONS

Gardner, W. A., "Spectral Correlation of Modulated Signals: Part II—Digital Modulation," IEEE Transactions on Communications, vol. Com-35, No. 6, Jun. 1987, pp. 595-601.

Jinkang, Z., et al., "The Application of Signal's Cyclostationarity on OFDM Systems," China Communications, Apr. 2006, pp. 70-76.

Lundén, J., et al., "Robust Nonparametric Cyclic Correlation Based Spectrum Sensing for Cognitive Radio," IEEE Transactions on Signal Processing, 2009, pp. 1-15.

Öner, M., et al., "Air Interface Identification for Software Radio Systems," Int. J. Electron. Commun. (AEÜ), 61, (2007), pp. 104-117.

Tkachenko, A., et al., "Cyclostationary Feature Detector Experiments Using Reconfigurable BEE2," in Proc IEEE Int. Symp. New Frontiers in Dynamic Spectrum Access Networks, 2007, pp. 216-219.

Turunen, V., et al., "Implementation of Cyclostationary Feature Detector for Cognitive Radios," Proceedings of the 4th International Conference on Crowncom, IEEE 2009, 4 pages.

* cited by examiner

CYCLOSTATIONARY SIGNAL DETECTION IN THE ANGULAR DOMAIN FOR COMMUNICATION SYSTEMS

TECHNICAL FIELD

The present invention is directed, in general, to communication systems and, more particularly, to apparatuses and methods for providing cyclostationary based algorithms for signal detection, such as may be used with radio frequency communication systems.

BACKGROUND

As wireless communication systems such as cellular telephone, satellite, and microwave communication systems become widely deployed and continue to attract a growing number of users, there is a pressing need to accommodate a large and variable number of communication subsystems transmitting a growing volume of data with a fixed resource such as a fixed channel bandwidth accommodating a fixed data packet size. Traditional communication system designs employing a fixed resource (e.g., a fixed data rate for each user) have become challenged to provide high, but flexible, data transmission rates in view of the rapidly growing customer base.

The third generation partnership project long term evolution ("3GPP LTE") is the name generally used to describe an ongoing effort across the industry to improve the universal mobile telecommunications system ("UMTS") for mobile communications.

Improvements in bandwidth capacity are being made to cope with continuing new requirements and the growing base of users, and higher data rates and higher system capacity requirements. Goals of this broadly based 3GPP project include improving communication efficiency, lowering costs, improving services, making use of new spectrum opportunities, and achieving better integration with other open standards and backwards compatibility with some existing infrastructure that is compliant with earlier standards.

The continuing need for additional spectrum/bandwidth is being addressed in various ways. In one approach to adding broadband spectrum, a transition has been made from analog terrestrial TV broadcast transmission to all digital TV ("DTV") broadcasting. The DTV signals require substantially less spectrum than the prior analog TV systems, thus freeing the "white space" between DTV transmitters. In the United States, this frequency spectrum is between 54 MHz and 862 MHz. It is possible for this spectrum to be used for broadband wireless communications to provide, for example, wireless voice and high speed internet access in rural areas, and additional broadband communications bandwidth in densely populated or high use areas. However, to use this space correctly, the wireless communications devices must be able to avoid interference with the prior primary users, such as DTV stations, and certain wireless microphones, which are licensed to use the spectrum. To do this the base stations (or NBs) and customer premises equipment (CPEs), whether fixed or portable, must adaptively communicate to avoid introducing interference with the existing transmitters.

A proposed IEEE standard IEEE P802.22, covering Wireless Regional Access Networks ("WRAN") addresses the use of the "white space". More information is available from the IEEE working group website at the URL http://www.ieee802.org/22/. The standard addresses the use of the unused "white space" and particularly for adding broadband services for rural areas. A requirement of the WRAN standard is that the new broadband communication devices, such as base stations, do not interfere with existing transmitters using the spectrum. One approach that is developing in the WRAN and other similar systems is the use of cognitive radio transceivers. Cognitive radio devices may effectively use shared spectrum where they must adapt to the presence of other signaling devices (for example existing DTV transmitters, or other primary transmitters using the spectrum), and where blind detection of signals is required. The cognitive radios can identify unknown transmitted signals in the spectrum and by adaptively receiving them, can tune to and communicate with the sending device and create a communications channel. The ability to identify transmitters also makes it possible to avoid interfering with them. That is, the cognitive radios use spectrum sensing to identify transmissions as part of the process of adapting radio frequency communications to the transceivers, and avoiding interference.

Detection of a transmitted signal can be done in a variety of ways. Simple power detection techniques may be used, however, for certain devices such as portable cellular phones, low power transmission levels are used and simple power level detection may not be sufficient to distinguish these transmissions from noise or other possible sources.

A method of spectrum sensing of signals for cognitive radio that has been proposed is the use of cyclostationary based spectrum sensing algorithms, ("CBSSA"). Because signals, including the OFDM/OFDMA signals used for wireless communications, exhibit a periodicity not found in Gaussian noise, it is possible to discriminate such signals from noise by determining whether a cyclostationary property exists with respect to samples of the received signal. However, the CBSSA algorithms known to date require extensive resources including multipliers and large memory storage that make implementation of such algorithms in commercially practicable integrated circuits, such as integrated circuits including ASICs, FPGAs, CPLDs, and the like, impractical.

The wireless communication systems as described herein are applicable to, for instance, wireless communication systems and communications systems, including but not limited to WRAN that could benefit from the use of CBSSA for signal detection.

A need this exists for systems and methods to efficiently provide spectrum sensing of signals using cyclostationary based spectrum sensing algorithms without the disadvantages of the known prior approaches.

SUMMARY OF THE INVENTION

These and other problems are generally solved or circumvented, and technical advantages are generally achieved, by advantageous embodiments of the present invention which include an apparatus and methods according to an embodiment comprising: receiving input samples of a signal having expected predetermined properties; transforming the input samples to angular form and obtaining data samples corresponding to at least one angle vector; performing a cyclostationarity test on the at least one angle vector, the cyclostationarity test being done entirely in an angular domain; wherein the cyclostationarity test comprises testing the data samples of the at least one angle vector for a non-uniform distribution, the non-uniform distribution of the data samples of the at least one angle vector indicating cyclostationarity in the input samples; and where cyclostationarity in the input samples is determined, refraining from transmitting radio frequency signals over an air interface at a frequency corresponding to the received signal.

The foregoing has outlined rather broadly the features and technical advantages of the present invention so that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, reference is now made to the following descriptions taken in conjunction with the accompanying drawing, in which.

DETAILED DESCRIPTION

Figure 1:
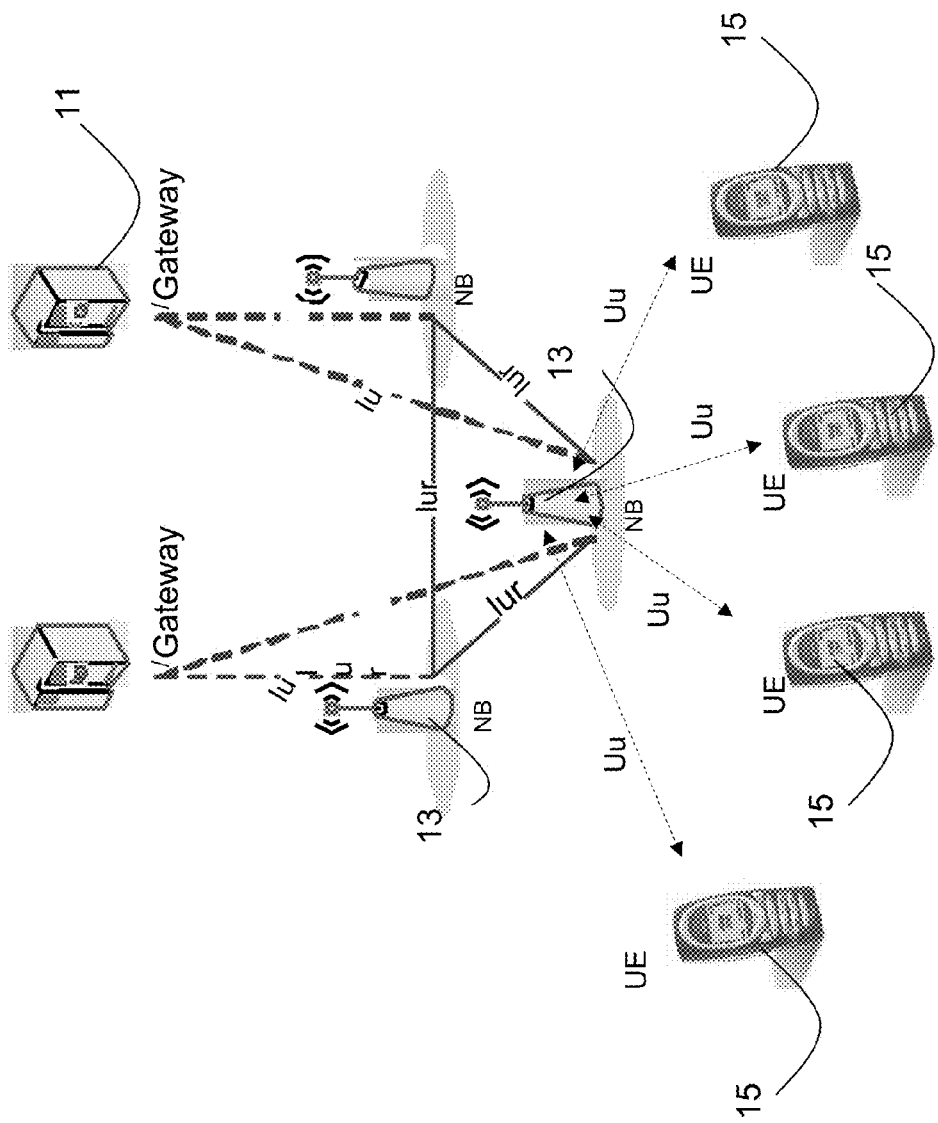
FIG. 1 illustrates equipment communicating to and from a NB to a variety of UEs over an air interface, and a UTRAN communications system compatible with the embodiments of the invention.

Referring initially to FIG. 1, a system level diagram for a wireless communication system that provides an environment for the application of the principles of the present invention is illustrated. The wireless communication system provides an example UTRAN architecture including base stations 13 providing UTRAN user plane (packet data convergence protocol/radio link control/media access control/physical transport) and control plane (radio resource control) protocol terminations directed toward user equipments 15. The base stations 13 are shown interconnected to each other with an Iur interface or communication link. The base stations 13 are also connected by an Iu interface or communication link to a Gateway 11. The Iu interface supports a relationship between the CN entities and the base stations and supports a functional split between the CN and the UTRAN network entities. The user equipments 15 may be referred to as customer premises equipment ("CPE") in some standard terminology. CPE may be fixed or portable devices including computers, phones, web browsers, video and audio players, internet access points and the like.

The base stations 13 may host functions such as radio resource management (e.g., internet protocol ("IP"), header compression and encryption of user data streams, ciphering of user data streams, radio bearer control, radio admission control, connection mobility control, and dynamic allocation of resources to user equipment in both the uplink and the downlink). Additional functions may include selection of a Gateway 11 at the user equipment attachment, routing of user plane data towards the user plane entity, scheduling and transmission of paging messages (originated from the mobility management entity), scheduling and transmission of broadcast information (originated from the Gateway 11 or operations and maintenance), and measurement and reporting configuration for mobility and scheduling.

Figure 2:
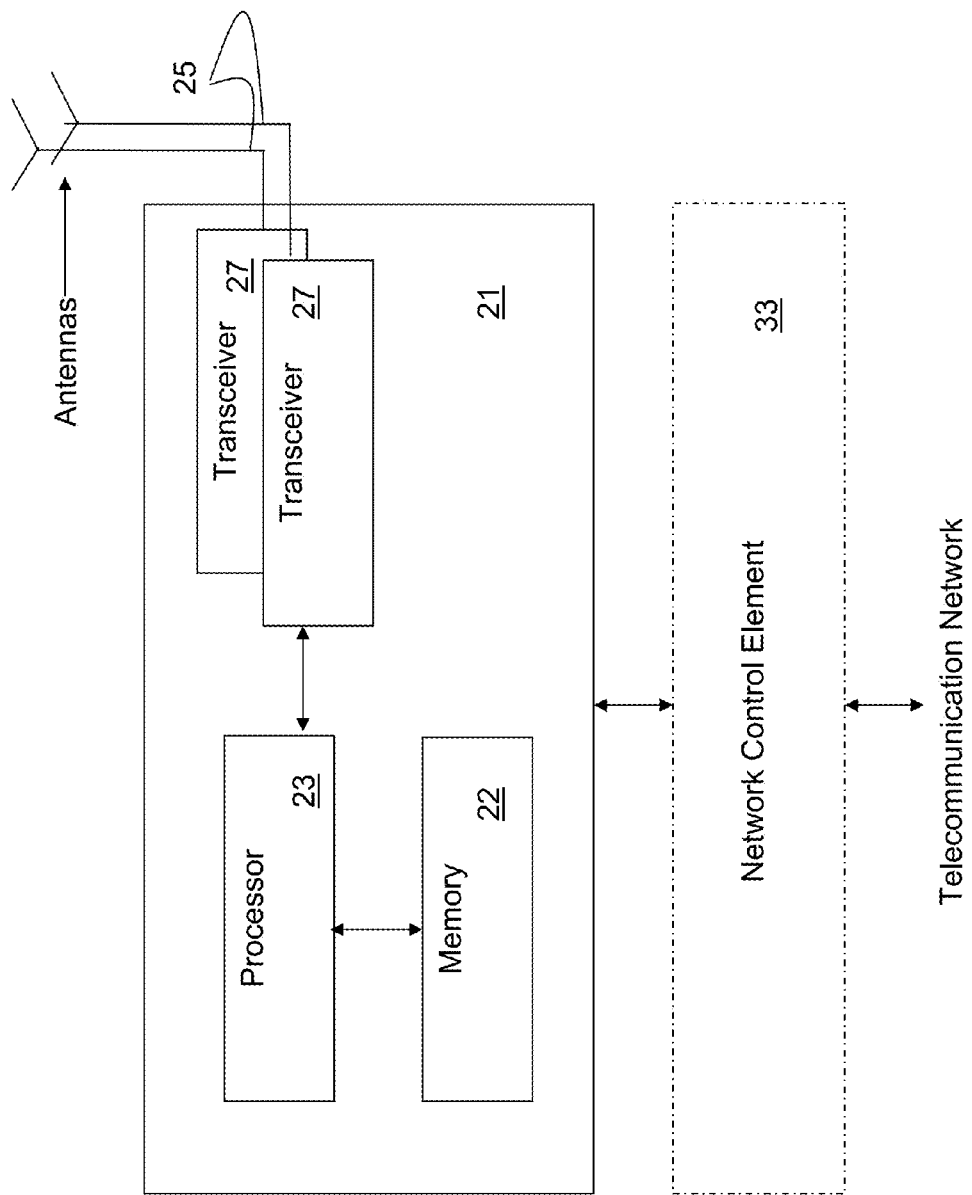
FIG. 2 illustrates a block diagram of a communication element according to an advantageous embodiment of the present invention.

FIG. 2 illustrates a simplified system level diagram of an example communication element of the communication system of FIG. 1. FIG. 2 provides an illustration of an environment and structure for application of the principles of the present invention. The communication element may represent, without limitation, an apparatus including a base station, user equipment, or customer premises equipment such as a terminal or mobile station, a network control element, or the like. The communication element 21 includes, at least, a processor 23, memory 22 that stores programs and data of a temporary or more permanent nature, such as programs for performing various algorithms, one or more antennas 25, and one or more radio frequency transceivers 27 coupled to the antennas and the processor for bidirectional wireless communication. Other functions may also be provided. The communication element 21 may provide point-to-point and/or point-to-multipoint communication services.

The communication element 21, such as a base station in a WRAN, UTRAN WCDMA network and E-UTRAN network may be coupled to a communication network element 33, such as a gateway coupled to a PTSN. The network control element may, in turn, be formed with a processor, memory, and other electronic elements (not shown). Network access may be provided using fiber optic, coaxial, twisted pair, microwave communication, or similar communication links coupled to an appropriate link-terminating element. A communication element 21 formed as a mobile station is generally a self-contained device intended to be carried by an end user and connects wirelessly to a Node B/eNB, thus in that case, it is not directly connected to element 33. Alternatively, a communication element 21 may be formed as a customer premises equipment (CPE) that communicates to the base station over the air interface. CPE may be portable or fixed equipment.

The processor 23 in the communication element 21, which may be implemented with one or a plurality of processing devices, performs functions associated with its operation including, without limitation, encoding and decoding of individual bits forming a communication message, formatting of information, and overall control of the communication element, including processes related to management of resources. Exemplary functions related to management of resources include, without limitation, hardware installation, traffic management, performance data analysis, tracking of end users and mobile stations, configuration management, end user administration, management of the mobile station, management of tariffs, subscriptions, and billing, and the like. The execution of all or portions of particular functions or processes related to management of resources may be performed in equipment separate from and/or coupled to the communication element, with the results of such functions or processes communicated for execution to the communication element. The processor of the communication element 21 may be of any type suitable to the local application environment, and may include one or more of general-purpose computers, special-purpose computers, microprocessors, digital signal processors ("DSPs"), and processors based on a multi-core processor architecture, as non-limiting examples. User definable integrated circuit devices such as field programmable gate arrays ("FPGAs"), complex programmable logic devices ("CPLDs") and application specific integrated circuits (ASICs) may be used in conjunction with or instead of existing microprocessors, DSPs, and the like to implement the embodiments. Reusable cores such as reduced instruction set computer "RISC" and advanced RISC machines ("ARM") cores, for example, may be included with the user definable devices.

The transceivers 27 of the communication element 21 modulate information onto a carrier waveform for transmission by the communication element via the antennas 25 to another communication element. The transceiver demodulates information received via the antennas for further processing by other communication elements. In FIG. 2, the device 21 has multiple antennas 25 and corresponding transceivers 27.

The memory 22 of the communication element 21, as introduced above, may be of any type suitable to the local application environment, and may be implemented using any suitable volatile or non-volatile data storage technology, such as a semiconductor-based memory device, a magnetic memory device and system, an optical memory device and system, fixed memory, and removable memory. The programs stored in the memory may include program instructions that, when executed by an associated processor, enable the communication element to perform tasks as described herein. Exemplary embodiments of the systems, subsystems, and modules as described herein may be implemented, at least in part, by computer software executable by processors of, for instance, the mobile station and the base station, or by hardware, or by combinations thereof. Other programming may be used such as firmware and/or state machines. As will become more apparent, systems, subsystems and modules may be embodied in the communication element as illustrated and described above. Further, the communication element 21 may store in memory 22 various information that persists, including configuration information, for use in communicating over the air interface.

FIG. 2 depicts a communication element 21 that has multiple antennas 25. Current specifications for the 3G standard contemplate eNBs with 1, 2 or 4 antennas, likewise UEs may have 1, 2 or 4 antennas, and these multiple antenna arrangements may be extended to more than 4 in future standards. For a multi-user multiple input multiple output ("MU-MIMO") UE, at least 2 antennas and associated transceiver circuitry may be provided.

Figure 3:
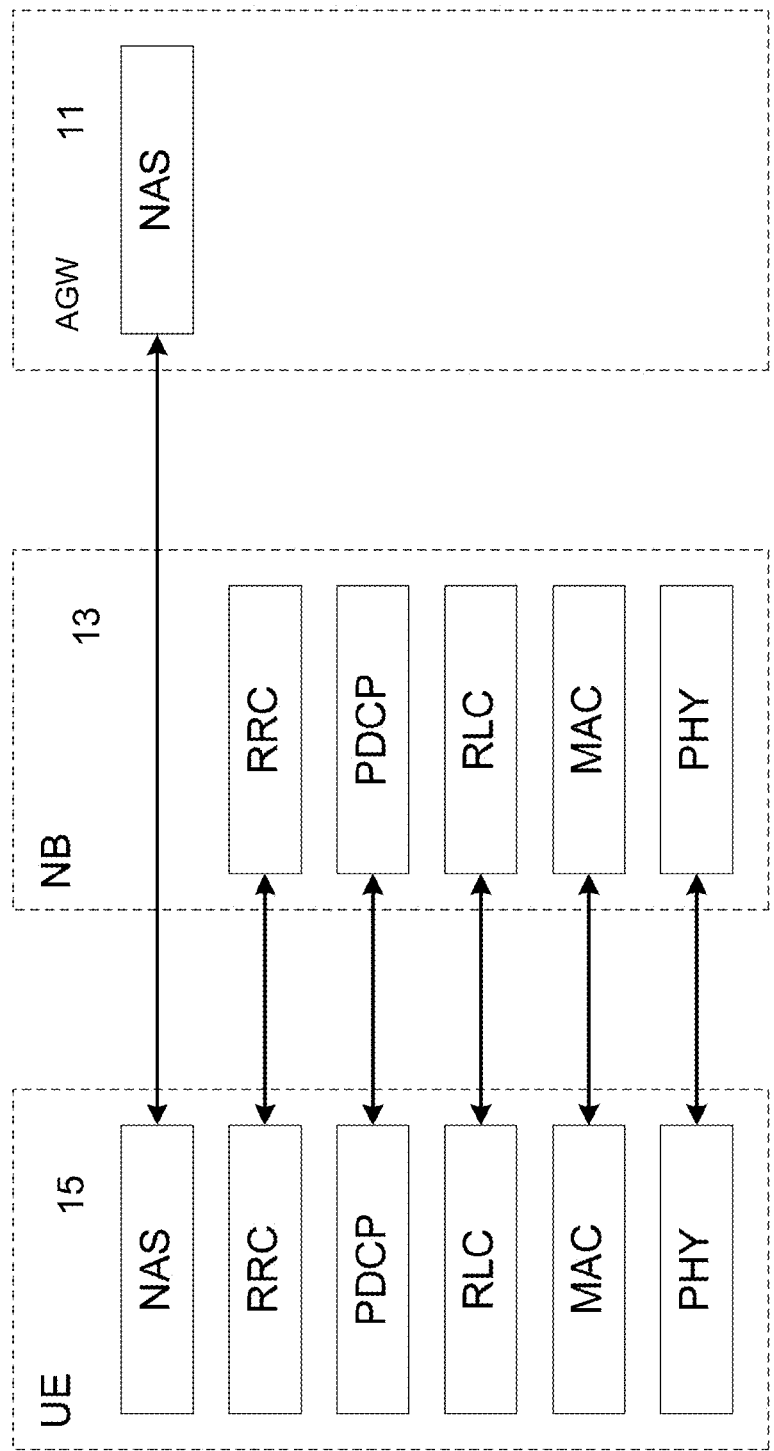
FIG. 3 illustrates communication layers of a UE, NB and a gateway compatible with an advantageous embodiment of the present invention.

FIG. 3 depicts a block diagram of an embodiment of user equipment 15 and a base station 13 constructed according to the principles of the present invention. The user equipment UE 15 and the base station NB 13 each include a variety of layers and subsystems: the physical layer ("PHY") or Layer 1 subsystem, a medium access control layer ("MAC") subsystem, a radio link control layer ("RLC") subsystem, and a radio resource control layer ("RRC") subsystem. The RLC and MAC subsystems are at Layer 2. The UE and NB communicate to an access gateway ("AGW") 11.

The physical layer subsystem supports the physical transport of packets over the air interface and provides, as non-limiting examples, cyclic redundancy check ("CRC") insertion (e.g., a 24 bit CRC is a baseline for physical downlink shared channel ("PDSCH"), channel coding, physical downlink control channel ("PDCCH") coding, physical layer hybrid-automatic repeat or retransmit request ("HARQ") processing, and channel interleaving. The physical layer subsystem also performs scrambling such as transport-channel specific scrambling on a downlink-shared channel ("DL-SCH"), broadcast channel ("BCH") and paging channel ("PCH"), as well as common multicast channel ("MCH") scrambling for all cells involved in a specific multimedia broadcast multicast service single frequency network ("MBSFN") transmission. The physical layer subsystem also performs signal modulation such as quadrature phase shift keying ("QPSK"), 16 quadrature amplitude modulation ("16 QAM") and 64 QAM, layer mapping and pre-coding, and mapping to assigned resources and antenna ports. The media access layer or MAC performs the HARQ functionality and other important functions between the logical transport layer, or Layer 2, and the physical transport layer, or Layer 1.

Each layer is implemented in the system and may be implemented in a variety of ways. A layer such as the PHY in the UE 15 may be implemented using hardware, software, programmable hardware, firmware, or a combination of these as is known in the art. Programmable devices such as DSPs, reduced instruction set ("RISC"), complete instruction set ("CISC"), microprocessors, microcontrollers, and the like may be used to perform the functions of a layer. Reusable design cores or macros as are provided by vendors as ASIC library functions, for example, may be created to provide some or all of the functions and these may be qualified with various semiconductor foundry providers to make design of new UEs, or e-Node B implementations, faster and easier to perform in the design and commercial production of new devices.

For additional information about the physical layer implementation and configurations for 3GPP, Release 8, reference is made to the Technical Specification numbered 3GPP TS 25.211, version 8.4.0, dated Mar. 17, 2009, entitled "Physical Channels and Mapping of Transport Channels Onto Physical Channels (FDD)" (hereinafter, "TS 25.211"); the Technical Specification numbered 3GPP TS 25.212, version 8.5.0, Mar. 17, 2009, entitled "Multiplexing and Channel Coding (FDD)" (hereinafter "TS 25.212"); the Technical Specification numbered 3GPP TS 25.213, version 8.4.0, dated Mar. 17, 2009, entitled "Spreading and Modulation (FDD)" (hereinafter "TS 25.213"), the Technical Specification numbered 25.214, version 8.6.0, dated Jun. 8, 2009, entitled "Physical Layer Procedures (FDD)" (hereinafter "TS 25.214") and the Technical Specification numbered 3GPP TS25.848, version 4.0.0, dated Apr. 5, 2001, entitled "Physical Layer Aspects of UTRA High Speed Downlink Packet Access; Release 4" (hereinafter "TS 25.848"), each of which is hereby incorporated by reference herein in its entirety. Each of these documents is available from the 3GPP website at the URL www.3gpp.org.

Figure 4:
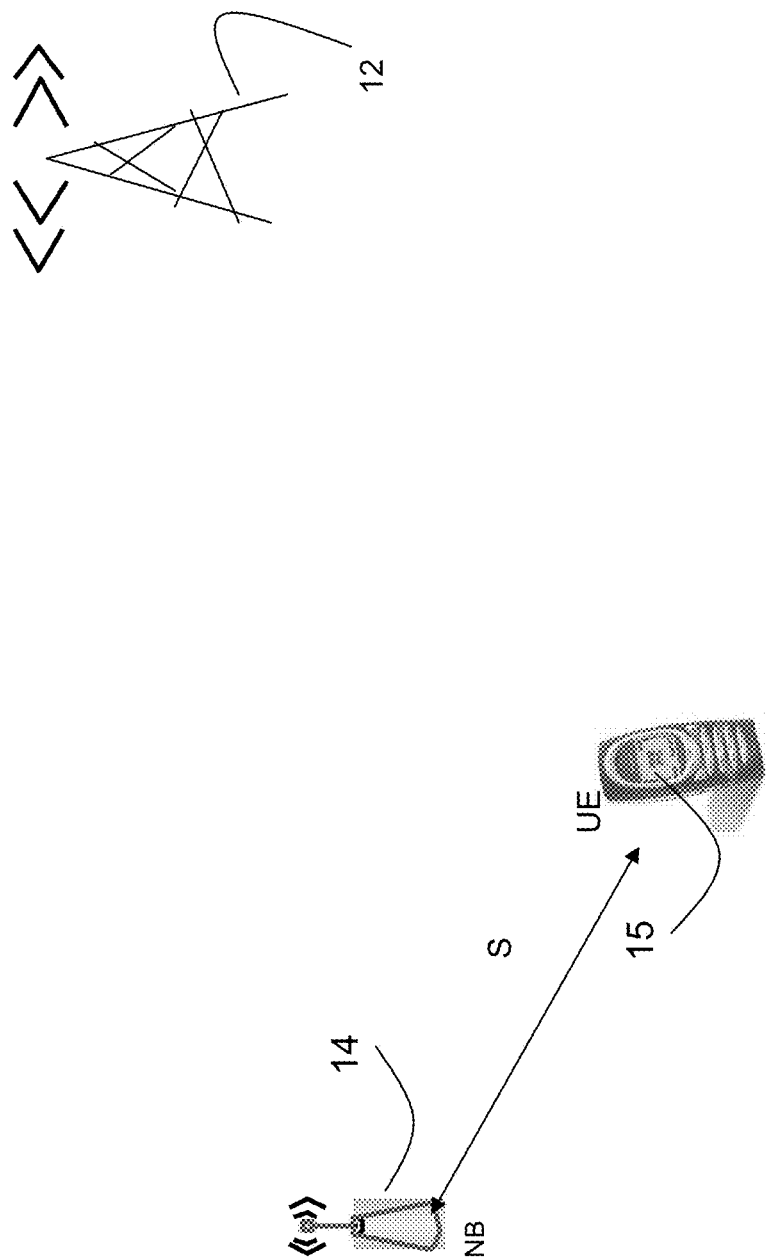
FIG. 4 illustrates in one example a known system for use with the embodiments.

FIG. 4 depicts an example illustrative environment for application of the embodiments. In FIG. 4, a region is shown where a base station or NB 14 is communicating both uplink and downlink messages over an air interface link "S" to a cellphone or UE 15, which may alternatively be referred to as a customer premises equipment ("CPE"). An existing DTV transmitter 12 is also present. For the wireless communications to share the DTV spectrum, that is the "white space", reference is made to the proposed IEEE802.22 standard which provides that the wireless stations are to provide service on a non-interfering basis. That is, in this example, the WRAN communications are not to interfere with the DTV transmitter. This in turn requires that the base station NB 14 and the CPE or UE 15 be adaptive, and flexible, meaning the frequencies used to communicate are not fixed but the transceivers can frequency hop, change coding, change modulation or use other approaches to avoid interfering with the licensed transmitters. Further, the NB at least, or both the NB and UE, need to be able to identify other transmitters using the spectrum (performs signal sensing). The use of cognitive radio techniques is part of the proposed IEEE802.22 WRAN standard. While the embodiments presented herein may be used in other applications, the WRAN is provided as an example illustrative application for the use of the embodiments. The embodiments are generally applicable to any environment where transmission may be possible in unallocated or unlicensed spectrum on a non-interfering basis. In order to determine whether transmission in the frequency spectrum is possible, a spectrum signal sensing algorithm is needed to identify existing transmissions.

Due to the superior detection sensitivity and the inherent ability to distinguish signal types one from another, the use of CBSSA algorithms is a promising approach for spectrum sensing in future systems, including cognitive radio systems. In a conventional approach a statistical test of the presence of cyclostationarity may be used. Known approaches may estimate the conjugate cyclic autocorrelation function of a signal x[n] as:

$$\hat{R}_x^\alpha = \frac{1}{N} \sum_{n=0}^{N-1} x[n]x^*[n-\tau]e^{-i2\pi\alpha n}, \quad \text{(Equation 1)}$$

where x[n] is a complex input signal, $\alpha$ is the cyclic frequency parameter, $\tau$ is the lag parameter used in autocorrelation and N is the number of samples.

In Equation 1 $\alpha$ and $\tau$ are both parameters that may be varied according to the application. Alpha ($\alpha$) is the cyclic frequency parameter, which may be predetermined when signals having certain properties are sought to be sensed, and tau ($\tau$) is a lag parameter that may also be predetermined depending on the signals that are sought to be sensed. Because the cyclostationarity of signals is dependent on factors including the coding, modulation, and other characteristics used in forming the signals, for a given standard that specifies signal transmission characteristics, these parameters may be predetermined.

For OFDM signals that are frequently used in wireless or radio frequency communications, one of the sources of cyclostationarity is the insertion of the cyclic prefix. An example of the information needed to determine the parameter values for the autocorrelation of Equation 1, then, are the length of the FFT (Fast Fourier Transform) and the cyclic prefix ("CP") used in modulation, which is found from the standard. For signals that do not use OFDM, one needs to look for other sources of cyclostationary features.

A test is then applied to determine whether the autocorrelation function indicates the presence of cyclostationarity in the samples of signal x[n] for different values of $\alpha$ and $\tau$; or not.

U.S. Patent Publication No. 2010/0054352, entitled "Correlation Based Detection in a Cognitive Radio System", published Mar. 4, 2010, which is co-invented by one of the inventors of the present application and which is hereby incorporated in its entirety herein by reference, discloses the use of decimation of the cyclic spectrum to improve the conventional approach to the autocorrelation function, and demonstrates an accompanying hardware savings. Further, in a paper entitled "Robust nonparametric cyclic correlation based spectrum sensing for cognitive radio", J. Lunden, S. A. Kassam, and V. Kiovunen, IEEE Transactions on Signal Processing, Vol. 58 p. 38-52, January 2010, which is also hereby incorporated in its entirety herein by reference, it is shown that the amplitudes of the received signal samples can be normalized without altering the cyclostationary features of the samples.

Embodiments of the present invention provide alternative algorithms, methods and implementations for providing spectrum sensing using CBSSA in a radio frequency signaling system. For example, in one illustrative application cognitive radios may use CBSSA algorithms to detect signals in the TV "white space" spectrum. The embodiments may be used in spectrum sensing to detect signals, generally.

In the embodiments, the signal samples, which are initially complex input signal samples, are first converted to the angular domain by a transformation. Then the remaining steps are all performed in the angular domain. An angular domain form of a conjugate autocorrelation function is provided. The angular domain form of the autocorrelation function is a sum of angles having vectors. Taking advantage of the fact that for an input signal with N samples, the angle vector may be computed without the need for any large multipliers, the N samples of the angle vector are then tested for non-uniformity of distribution. If the distribution is non-uniform, then the input samples are not additive white Gaussian noise ("AWGN"), but instead the input samples show cyclostationarity, e.g. the CBSSA indicates a signal is detected in the frequency spectrum corresponding to the input samples. If the distribution is uniform, then there is no cyclostationarity, and this result indicates no signal is present.

Embodiments of the present invention provide algorithms, and hardware and software implementations of the algorithms, to perform an efficient CBSSA. The embodiments provide advantages over existing approaches by eliminating the need for expensive resources such as large multipliers and by reducing memory storage demands needed to perform the algorithms. In this manner the embodiments may be implemented in commercially practical forms such as integrated circuits including application specific integrated circuits ("ASICs"), complex programmable logic devices ("CPLDs"), or field programmable gate arrays ("FPGAs"), or in software or firmware by programming existing processors and integrated circuits to perform the methods. The algorithms may then be performed in base stations such as NBs, in CPEs, and in UEs including fixed and portable devices.

The conventional autocorrelation function can be transformed to the angular domain as follows, starting with the rectangular form:

$$\hat{R}_x^\alpha = \frac{1}{N} \sum_{n=0}^{N-1} x[n]x^*[n-\tau]e^{-i2\pi\alpha n}, \quad \text{(Equation 1)}$$

Where x[n] is a complex input signal, $\alpha$ is the cyclic frequency, $\tau$ is the lag parameter (i.e. delay in autocorrelation) and N represents the number of samples. For a cyclostationary signal, the autocorrelation, $x[n]x^*[n-\tau]$, is periodic for some delay $\tau$, and cyclic frequency is related to that period (i.e., cycle time). With these values for parameters $\alpha$ and $\tau$ Equation 1 is ideally non-zero and therefore can be used for detection. Because the actual parameter values vary from one signal type to another, it detects only the signal that is denoted by the selection of α and τ parameter values. The samples are transformed to the angular form:

$$\phi_x[n] = \arg(x[n]) \quad \text{(Equation 2)}$$

And it can be shown that the autocorrelation function can now be rewritten in the polar form as:

$$\hat{R}_x^\alpha = \frac{1}{N}\sum_{n=0}^{N-1} e^{j(\varphi_x[n] - \varphi[n-\tau] - \varphi_x[n])}, \quad \text{(Equation 3)}$$

The polar form of the autocorrelation function is derived as follows. Assuming the absolute values (radius in polar coordinates) of x(n) are normalized to 1, which is justified in the paper by J. Lunden et al. that is incorporated by reference above, x(n) (and x(n−τ)) can be expressed in polar form using only the argument from (2) above as:

$$x[n] = e^{j\phi_x[n]}, \; x[n-\tau] = e^{j\phi_x[n-\tau]}. \quad \text{(Equation a1)}$$

In polar coordinates, the complex conjugate of $re^{j\phi}$ is $re^{-j\phi}$, and therefore $$x^*[n-\tau] = e^{-j\phi_x[n-\tau]}. \quad \text{(Equation a2)}$$

Thus, Equation 3 is completed by substitution for x[n], x[n−τ], where $\phi_\alpha[n] = 2\pi\alpha n$ and the conjugation is replaced by inverting the angle.

If the summation in Equation 3 were to be calculated, then it would be necessary to transform the samples back to the rectangular form. Instead, in the embodiments, a hypothesis test is made for the vector of the angles:

$$\Phi_x^\alpha[n] = \phi_x[n-\tau] - \phi_\alpha[n]. \quad \text{(Equation 4)}$$

Additional advantage is taken of the fact that for the case where the input vector x[n] is a complex Gaussian (noise), the argument of x[n] is uniformly distributed in the interval from 0 to 2π. Consequently, the angle vector $\Phi_x^\alpha[n]$, which is N samples in length and represents the sum of arguments of two independent samples from x[n], and the α term, is also uniformly distributed. To be precise, the sum of two uniformly distributed random variables results in triangular distribution from 0 to 4π, but when the angles above 2π are mapped back to [0-2π] by removing higher multiples of 2π, the distribution is uniform. Therefore, to reject the null hypothesis (reject the hypothesis the input signal samples are Gaussian, or noise), a test is made to determine if the N data samples of the angle vector $\Phi_x^\alpha[n]$ are not uniformly distributed. If the input samples represent a signal that is not AWGN, then the received signal has cyclostationarity, that is, the distribution of the data samples of the angle vector $\Phi_x^\alpha[n]$ is non uniform.

Figure 5:
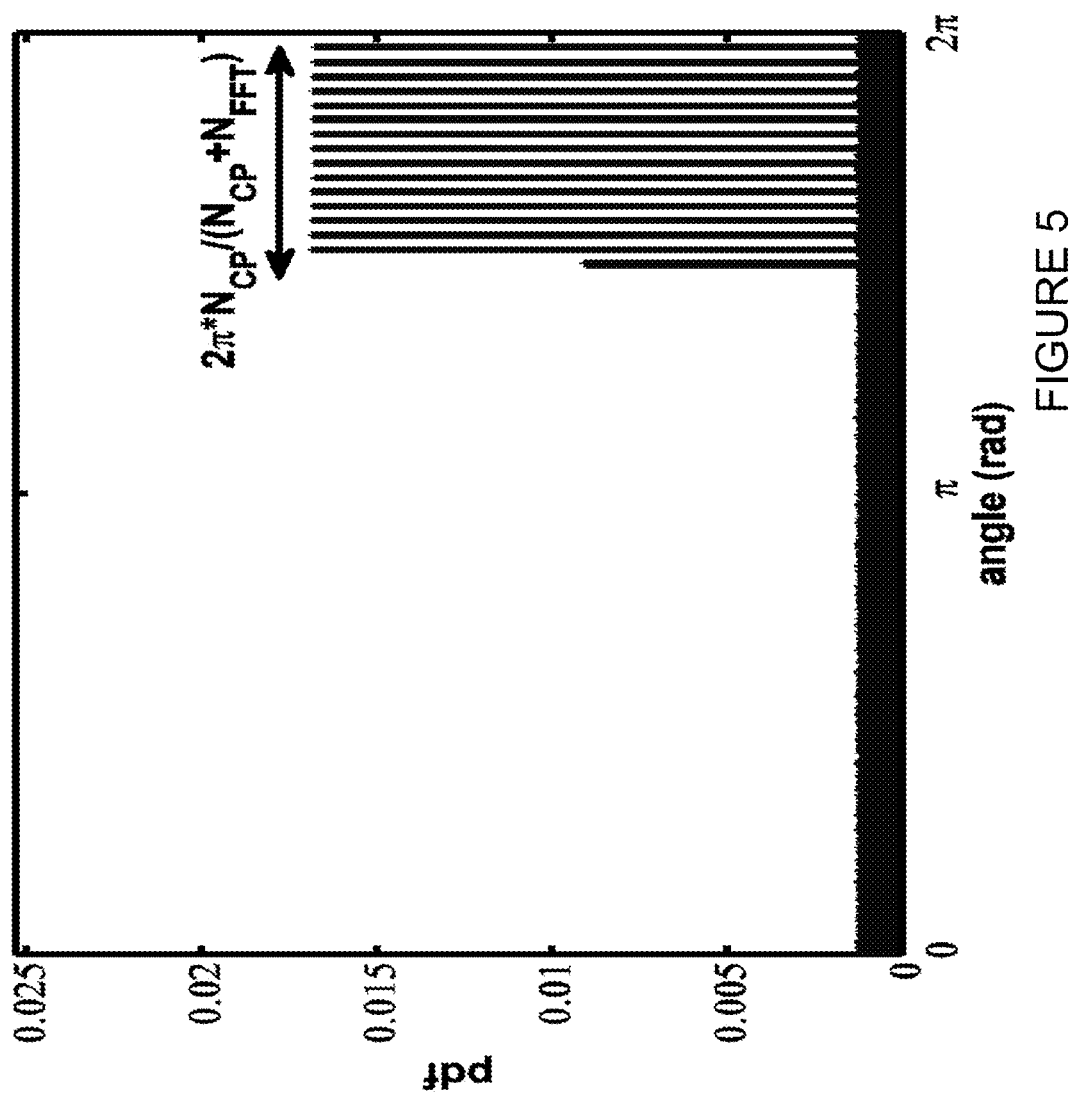
FIG. 5 illustrates a simulated probability distribution functions for an OFDM signal.

The probability distribution function ("pdf") for a communications signal can be seen in an example shown in FIG. 5. In FIG. 5, the distribution pdf is plotted on the vertical axis, the angle (in radians) is plotted on the horizontal axis, and the distribution is for a noiseless OFDM signal, with $N_{FFT}=48$, and $N_{CP}=N_{FFT}/3=16$, with subcarrier modulation of 16-QAM, obtained from a vector of $10^6$ samples, with α set at 1/64 (relative to 2π) and τ=48. The parameter α is the cyclic frequency, and τ is the lag parameter, in autocorrelation. In FIG. 5, the significance of the term $2\pi*N_{CP}/(N_{CP}+N_{FFT})$ can be seen. The referred term $2\pi*N_{CP}/(N_{CP}+N_{FFT})$ highlights the fact that the width of the "non-uniform part" of the observed distribution depends on the ratio of $N_{CP}$ and $N_{FFT}$.

Figure 6A:
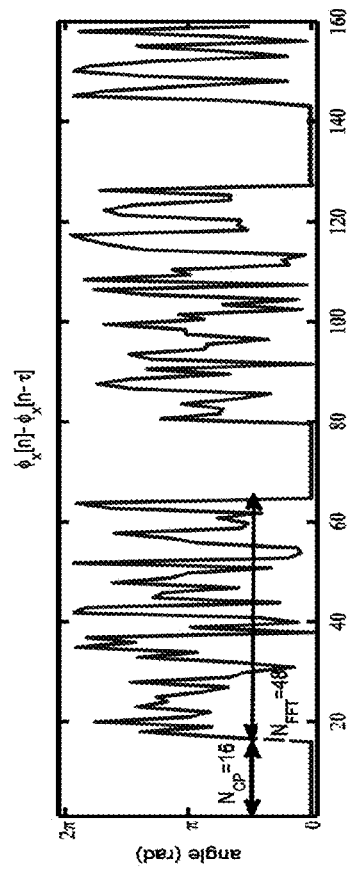
FIGS. 6a, 6b and 6c illustrate time domain plots for the same OFDM signal as in FIG. 5.
Figure 6B:
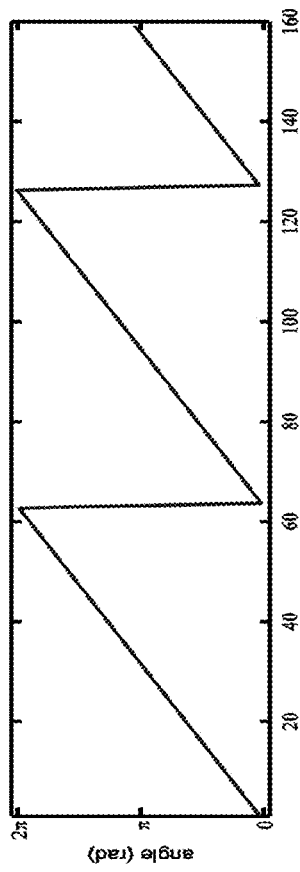
Figure 6C:
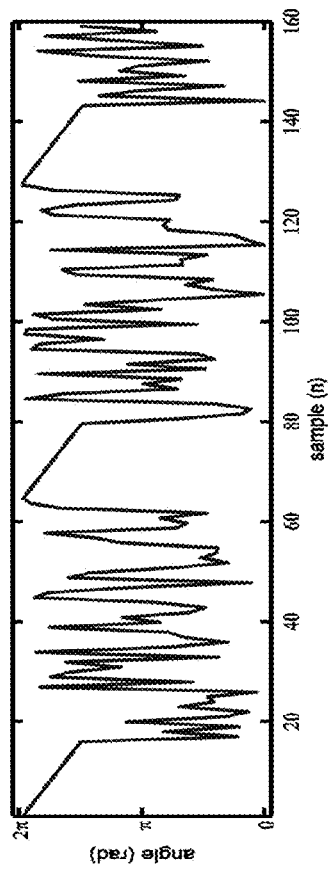

The distribution of FIG. 5 can be better understood by examining the components of the angle vector $\Phi_x^\alpha[n]$ in the time domain, as depicted in FIGS. 6a, 6b and 6c, where the vertical axis is the angle in radians. In FIG. 6a, for the same OFDM signal as shown in FIG. 5, the sum of the phase angle signals $\phi_x[n]-[n-\tau]$ is shown in the time domain. As can be seen in the figure, in the correlating part, the terms $\phi_x[n]$ and $\phi_x[n-\tau]$ cancel each other, while elsewhere the sum is approximately uniformly distributed. FIG. 6b plots the α term and FIG. 6c plots the complete function $\Phi_x^\alpha[n]$ in the time domain. As can be seen, the same slice of $\phi_x[n]$-appears periodically in $\Phi_x^\alpha[n]$ in FIG. 6c, and results in non uniform distribution.

Figure 7:
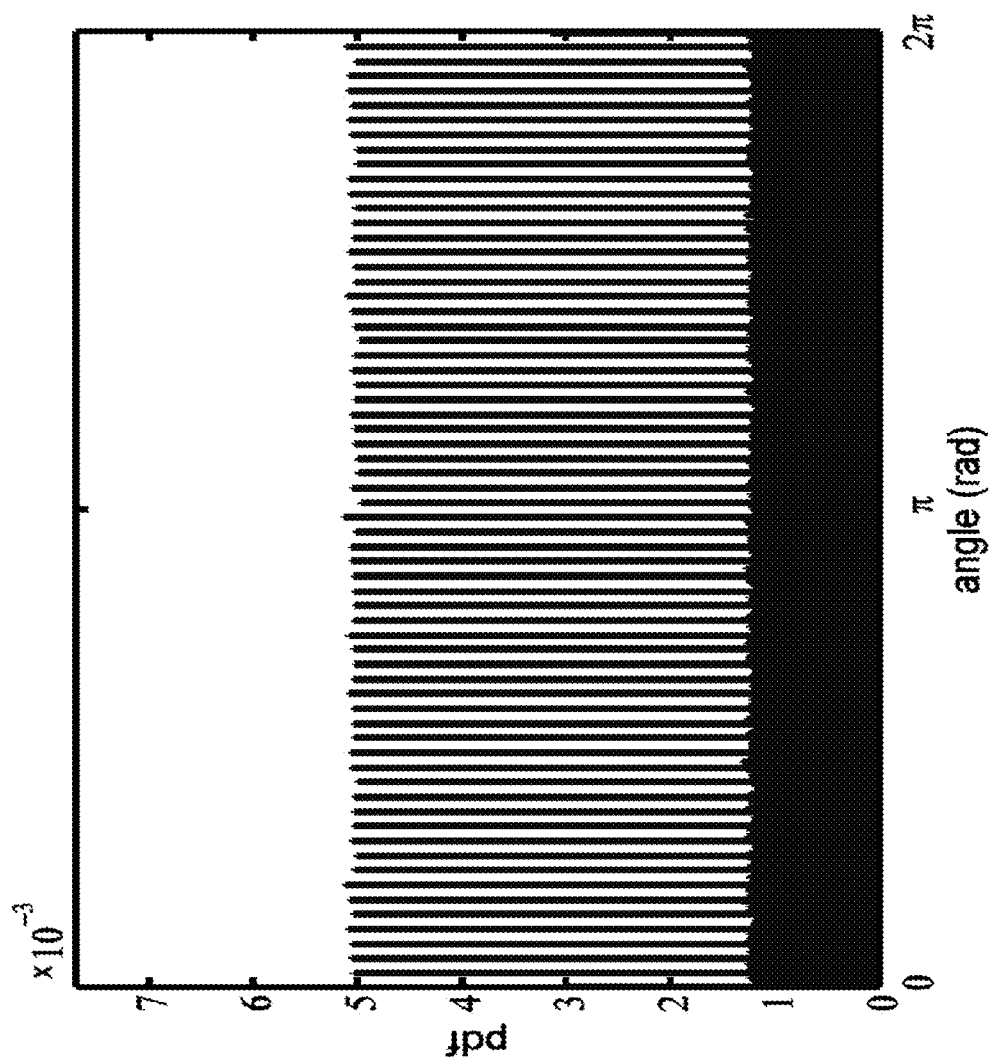
FIG. 7 illustrates a modified probability distribution function of the signal in FIG. 5.

In FIG. 7, a distribution is illustrated in the angular domain when the period of $\phi_\alpha[n]$ is not the same period as or a multiple of the period in the first sum term, then again the distribution for $\Phi_x^\alpha[n]$ approaches a uniform distribution as the number of observed OFDM symbols grows large. In FIG. 7, the α term was increased to 1/65 from 1/64, and the horizontal axis plots the angle in radians. The same OFDM signal is used as for the distributions in FIGS. 6 and 5.

Figure 8A:
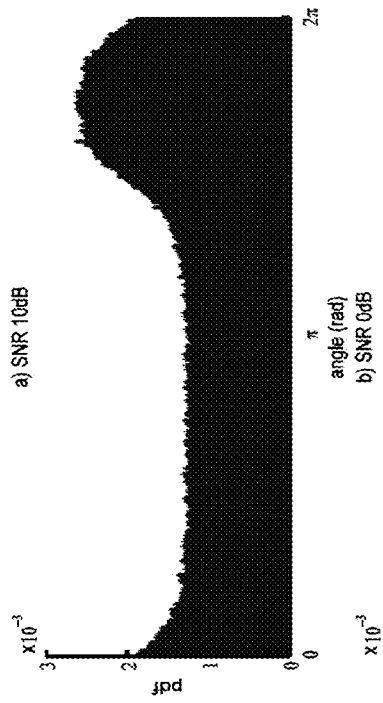
FIGS. 8a, 8b and 8c illustrate probability distribution functions of the signal in FIG. 5 in the presence of different noise levels.
Figure 8B:
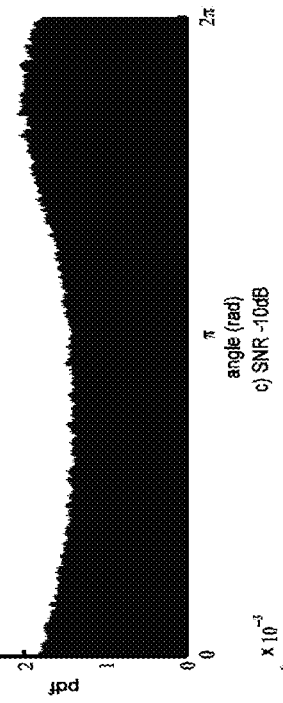
Figure 8C:
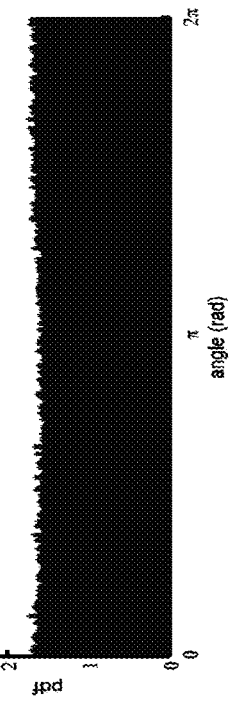

Adding noise to the signal causes the correlating part of $\phi_x[n]-\phi_x[n-\tau]$ to deviate from zero, thus the terms no longer cancel out each other perfectly. In the distribution this looks like a spreading function. This is illustrated in FIG. 8 for three different noise levels (three different signal-to-noise ratios ("SNRs")); again the horizontal axis is the angle in radians. In FIG. 8a, the distribution function is illustrated for the same OFDM signal as illustrated above, when the SNR is 10 dB. In FIG. 8b, the SNR is 0 dB (noise is increasing). In FIG. 8c, the noise is −10 dB. As can be seen from the figures, as the noise level increases (or as SNR decreases), the distribution spreads out and becomes more uniform.

Figure 9:
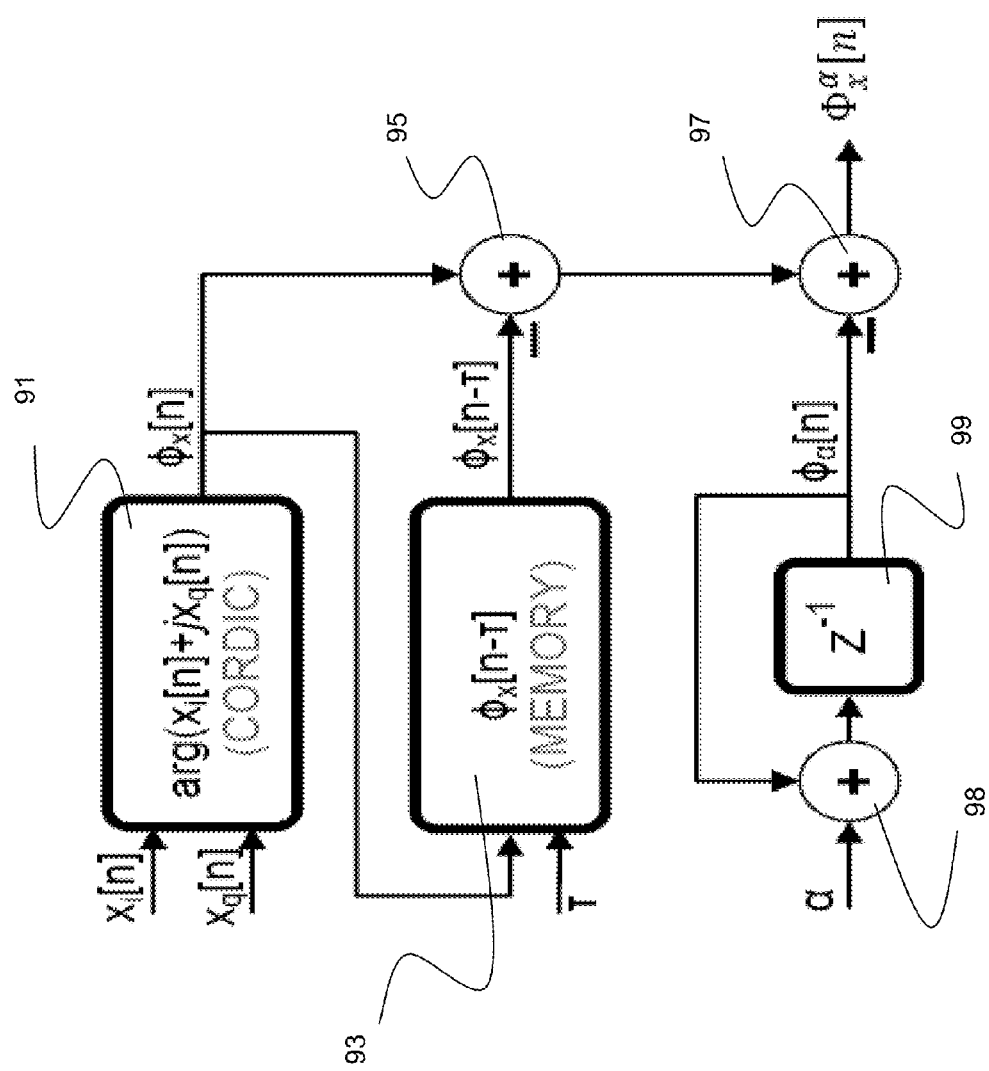
FIG. 9 depicts an algorithm embodiment for determining an angle vector.

FIG. 9 depicts a block diagram for an implementation that calculates the angle vector $\Phi_x^\alpha[n]$. To perform the methods of the embodiments, input signal samples are first transformed to angular form. A coordinate rotation digital computer ("CORDIC") 91 is used to calculate the phase angle of the complex input signal x[n]. The CORDIC also can be designed to map angles (−π to π) to a valued range (−1, 1) which is formed with k-bit two's complement binary numbers. When formatted this way, the overflow properties of the two's complement binary numbers perform modulo 2π arithmetic, and this results in a constant word length implementation (k-bits wide). Memory 93 then provides the term $\phi_x[n-\tau]$, which uses a programmable delay lag parameter τ and stores outputs of the CORDIC 91 to provide the delayed samples. Summer 95 then combines these two terms to form $\phi_x[n]-\phi_x[n-\tau]$. Delay element 99 and summer 98 provide the phase angle due to the α cyclic frequency parameter term, and summer 97 then forms the angle vector $\Phi_x^\alpha[n]$. The angle vector has N samples.

Once the angle vector $\Phi_x^\alpha[n]$ is completed, the embodiments test then samples of each angle vector for uniform or non-uniform distribution. As described above, if the samples of the angle vector are uniformly distributed, the test indicates a Gaussian noise. To test, the data is checked for the goodness of fit for uniform distribution.

One approach would be to apply the well know Pearson's "chi-square" test for fit of discrete uniform distribution to the N samples. N observations could be divided among M cells (i.e. the angle range from −π-to π is divided into M equally sized sectors) and the test statistics could be calculated as:

$$X^2 = \sum_{m=1}^{M} \frac{\left(O_m - \frac{N}{M}\right)^2}{\frac{N}{M}}$$

where $O_m$=the number of observations in a sector or cell m. (Equation 5).

However, such a calculation requires M multiplications (to get the squared term in the numerator of Equation 5) and so another approach is used in the embodiments.

For uniformly distributed data, the number of observations O in a cell m follows the binomial distribution:

$$O \sim B\left(N, \frac{1}{M}\right)$$

where M is the number of cells (Equation 6). In one embodiment, M=4 has been found to be a good value. Typically, in various alternative embodiments, M will be a power of 2.

The observations are categorized into M equally sized sectors and for each one, the number of observations (samples of each of the angle vector being tested) within that sector is simply counted. If the number of observations in any one of the sectors falls below, or rises above, predetermined maximum or minimum thresholds, then the distribution is non-uniform for the samples tested.

The non-uniformity test compares the number of observations in each cell to pre-calculated minimum and maximum thresholds. Crossing one of the thresholds in any one of the cells indicates a positive detection result. All that remains is to determine the thresholds.

By selecting an appropriate false alarm rate $P_{fa}$, the upper and lower thresholds for O in any cell can be determined from the cumulative distribution function of the binomial distribution, using the following equations:

$$1 - Pr(O \le T_h) = \frac{1 - (1 - P_{fa})^{\frac{1}{M}}}{2} \quad \text{(Equation 7)}$$

$$Pr(O \le T_l) = \frac{1 - (1 - P_{fa})^{\frac{1}{M}}}{2} \quad \text{(Equation 8)}$$

Due to the quantized nature of the binomial distribution, feasible values of $P_{fa}$ are also discrete, but for practical values of N, $P_{fa}$ can be selected reasonably close to any desired value. A typical value to use would be $P_{fa}$=5%, meaning that a noise only input signal would result in false alarm in five out of one hundred detections. Other values of $P_{fa}$ may also be used.

Using the fact that the most significant bits ("MSBs") of the twos complement binary values indicate which of the equal sized sectors each sample of the angle vector $\Phi_x^\alpha[n]$ falls into (in the example embodiment described above, these sectors may be referred to as "quadrants" when using M=4), the embodiments implement the non-uniformity test in hardware, or software, forms.

In an illustrative non-limiting example embodiment, the CBSSA algorithm detector is used to determine if 802.11g/a WLAN signals are present (or not present) on an observed channel. It is assumed that received signal samples are obtained at the WLAN baseband sampling rate (20 MHz). For the WLAN OFDM signal, $N_{FFT}$=64 and $N_{CP}$=16. To detect the presence of a WLAN signal, the detector parameters cycle frequency ($\alpha$) and lag ($\tau$) are determined according the WLAN standard. Formulas are:

$$\alpha = 2*\pi/(N_{FFT}+N_{CP}) = \pi/40 \text{(radians/sample)}$$

$$\tau = N_{FFT} = 64 \text{(samples)}$$

Next, the embodiment algorithm requires a selection of the number of received samples (N), and the probability of false alarm ($P_{fa}$). In one exemplary embodiment, the test may be performed using N=8000, which equals 100 consecutive WLAN OFDM symbols. A single detection, i.e., computation of one yes/no answer for non-uniformity of the samples in an angle vector corresponding to one set of input samples N, then takes approx. 8000/20 MHz=400 µs. The false alarm value $P_{fa}$ is set to 0.05 (5%), which means that for noise only input, 5% of detection results would mistakenly indicate signal present.

Now to continue the example embodiment, the thresholds $T_{high}$ and $T_{low}$ are obtained from equations (7) and (8) using N=8000, M=4 and $P_{fa}$=0.05. The resulting thresholds are $T_h$=2097 and $T_l$=1903. (Thus, for uniform distribution, 8000 observations would divide evenly among the M=4 cells resulting in 2000 observations per cell).

The embodiment tests and apparatus for cyclostationarity may be used for any environment where a signal having certain properties may be (or may not be) present. The modulation, coding and other characteristics of the signal will determine the alpha and tau parameter values. The upper and lower limits may be calculated based on the desired false alarm term $P_{fa}$ value as shown above.

Figure 10:
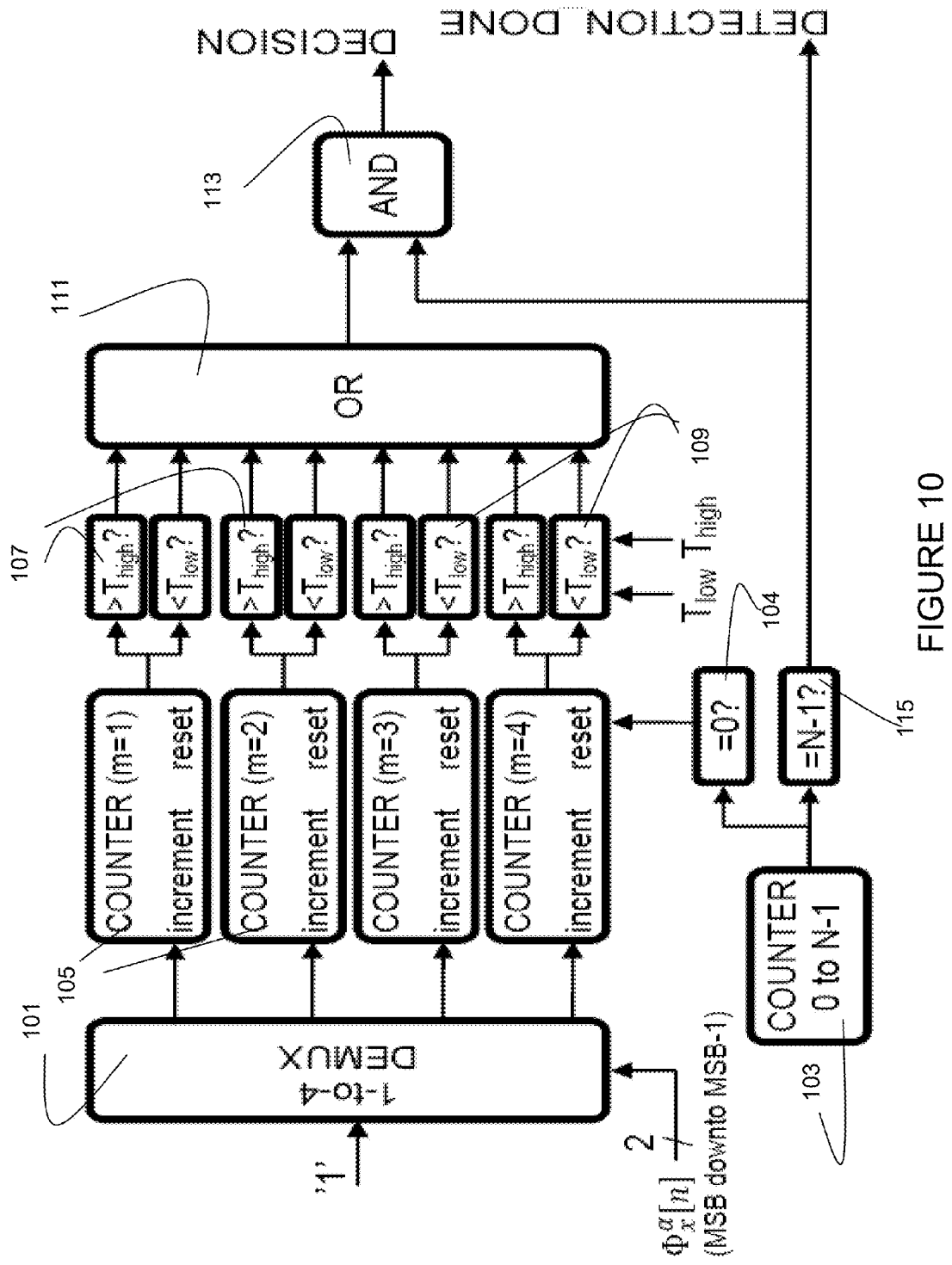
FIG. 10 depicts an embodiment implementation of a non-uniformity test for a cyclostationary algorithm.

FIG. 10 depicts, in a block diagram, a first hardware embodiment implementation for the non-uniform distribution test. A multiplexer 101 determines which sector (quadrants in an embodiment where M=4, but this is only one exemplary embodiment) or sector each sample falls into, using only the MSBs of the twos-complement value of the samples for each angle vector. For each of the N samples, the counter corresponding to the respective sector is incremented each time a sample is observed in that sector. Note that only the MSBs are used from the data set.

Counters 105 are incremented for each of N samples. If the count=0 (first new sample) the reset block 104 first outputs a reset to all the counters 105. Block 103 provides a simple indexing pointer, incrementing from the initial value of 0 to N−1.

Comparator 115 checks to determine if the test is complete. For each counter, two threshold tests are performed. A comparator 107 for each of the counters, (4 in this example), sets a flag if the upper limit threshold $T_{high}$ is exceeded. A comparator 109, for each of the counters, 4 in this example, sets a flag if the minimum threshold $T_{low}$ is not met for the corresponding counter. OR gate 111 outputs a signal. This signal indicates if, for any one or more of the counters, either the minimum threshold flag (count less than lower limit $T_{low}$) or the upper threshold flag (count greater than upper limit $T_{high}$) is set. The output of the OR gate is input to one of the two inputs of the AND gate 113, the other is the output of the DETECTION DONE comparator 115. Thus at the end of the test, the DECISION flag indicates a non uniform result (cyclostationarity is detected) if any of the counters is above the upper threshold $T_{high}$ or below the lower threshold $T_{low}$.

When considering the block diagram of FIG. 10, it is important to note that only the sample length counter (which counts from 0 to N−1), and the precalculated thresholds, depend on the number of samples N. Further the number of samples N is not restricted to powers of 2 only. In addition, for the exemplary embodiment where M=4, only the 2 MSBs of the vector angle $\Phi_x^\alpha[n]$ are needed to determine which sector that sample is in, thus relaxing the number of bits required in the datapath.

The block diagram of FIG. 10 is but one illustrative implementation of the embodiment for the non-uniformity test. Alternative arrangements also form additional embodiments. For example, the multiplexer 101 could be replaced by logic circuitry or, in this example, a 1 of 4 decode function. The counters could be replaced by shift registers, or other sequencing logic. The OR gate 111 and AND gate 113 may be replaced by a state machine, decoder or other control logic. Each of the functions may be implemented in a variety of ways that are also contemplated as additional alternative embodiments and which fall under the scope of the appended claims.

Figure 11:
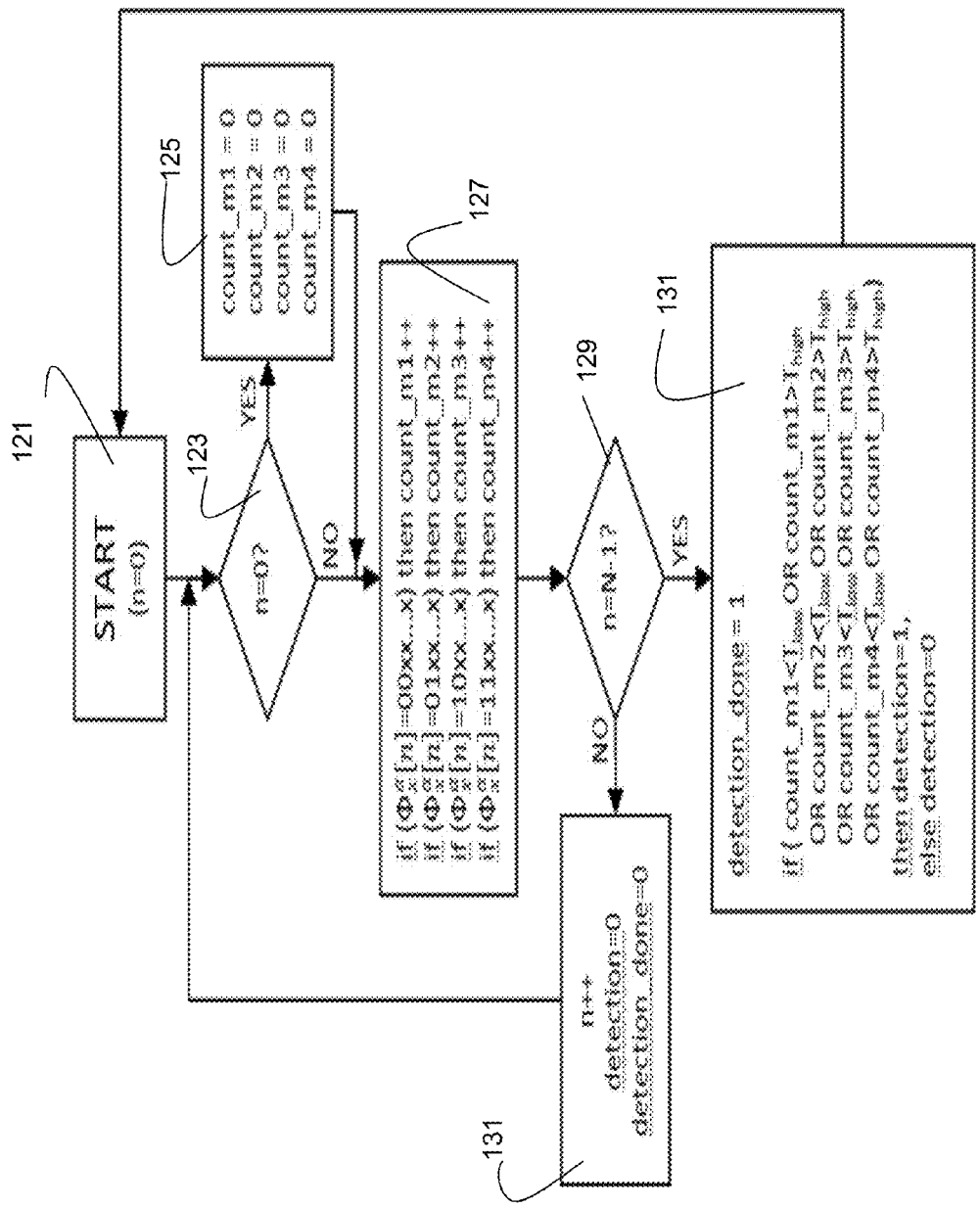
FIG. 11 depicts an embodiment flow chart of the test of FIG. 10.

FIG. 11 presents a method embodiment for the non-uniformity test in a flow chart diagram. The method shown in the flow chart diagram may be implemented in hardware, as in FIG. 10, in software, by a state machine, or by a dedicated circuit or integrated circuit, such as an ASIC or circuit device that is programmable or by a fixed dedicated hardware solution.

In FIG. 11, the flow diagram begins at state 121, with the index n set to zero. At state 123, the index n is tested in a decision state and if n is still zero, the diagram flows to state 125. Otherwise the diagram transitions to state 127.

In state 125, the counters are reset for each of the M cells. In this exemplary embodiment M=4, and so there are four counters labeled count_m1-count_m4.

In state 127, the angle vector sample indexed by n is tested. The MSBs are used to determine which cell the sample falls in. Since there are four possible cells when M=4, only two bits of the twos complement data are required. For other values of M in alternative embodiments, more bits of the N sample value would be used to make the sector determination. Also, if M were a larger value the number of counters would increase to the new value of M. In state 127, the counter indicated by the two MSBs is incremented. The diagram then transitions to state 129, where the index n is tested to see if the N samples in the data set for the angle vector have been processed. If n is still less than N−1, then more samples remain to be processed and the state diagram transitions to state 131. In state 131, the index n is incremented, and the process repeats at state 123.

Once the condition of state 129 is met, and all N samples (from 0 to N−1) have been processed, the state diagram flows to state 133, where the "detection done" flag is set. In state 131 the conditions for non uniformity are evaluated by the "OR" function. If the count stored by any one of the counters is greater than the upper threshold $T_{high}$, or less than the lower threshold $T_{low}$, then the detection flag is set, indicating a non uniform distribution (signal samples exhibit cyclostationarity). Otherwise, the detection flag remains at 0, while detection done is set to 1, indicating the process is complete and the distribution is uniform (signal is Gaussian, indicating noise).

Figure 12:
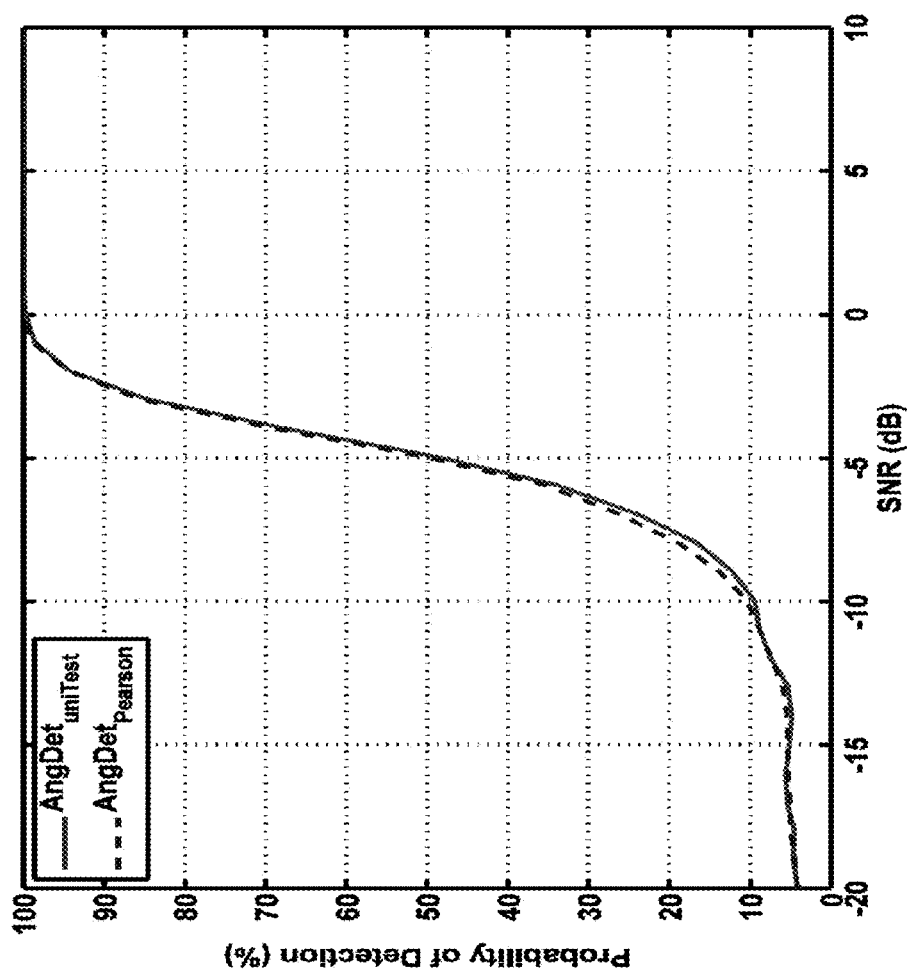
FIG. 12 illustrates a plot comparing results obtained with embodiments of the present invention to results obtained using existing approaches for signal detection.

FIG. 12 illustrates a comparison of detection performance for two approaches. The embodiment method of FIG. 11 is labeled $AngDet_{unitTest}$ and is drawn with a normal width line, and an approach using the well known Pearson's test is shown labeled $AngDet_{Pearson}$. In FIG. 12, the test of the embodiments is then compared to Pearson's test. For each test plotted, simulated signals that consisted of 32 OFDM symbols ($N_{FFT}$=48. $N_{CP}=N_{FFT}/3$=16, subcarrier modulation=16QAM) and the probability of detection was calculated from 5000 trials at each SNR point. The embodiment tests described above perform almost identically the Pearson test, as shown in the plot of FIG. 12. This result is achieved with less complexity. The embodiments perform as well as the Pearson test while providing less complexity and using fewer resources.

Embodiments of the present invention are intended to be applied in communications systems, including but not limited to WRAN systems, where spectrum sensing and signal detection are required or advantageous. In particular the embodiments provide an efficient CBSSA algorithm which may be used with cognitive radio transceivers. The embodiments could be used, in an alternative embodiment, to perform a "blind decoding" to evaluate whether a particular spectrum may be used. In such an application, the embodiment cyclostationarity test would be run using alpha and tau parameter values for a wide variety of possible cases, and if a lack of cyclostationarity were found for any frequency spectrum where interference was not permitted, then the spectrum could be further evaluated for possible use for additional transmission. In most applications, the signals sought to be sensed are known and so the values for the parameters are also available as predetermined values.

The embodiments may be implemented as hardware, software, firmware, or combinations of these. For programmable receivers having a processor, microprocessor or the like that is capable of implementing steps of a method stored as computer instructions, the embodiments may be provided as executable code stored in a machine readable form. For example, in an embodiment a computer readable product storing instructions is provided which, when the instructions are executed by a programmable processor within a receiver, cause the receiver to perform: receiving input samples of a signal having certain properties, transforming the input signals to the angular domain, and obtaining at least one angle vector, performing a cyclostationarity test completely in the angular domain, wherein performing the cyclostationarity test comprises testing the samples of the at least one angle vector for non-uniformity, if non-uniformity is found indicating the presence of cyclostationarity, and if a lack of cyclostationarity is found in the test, indicating that a signal having the certain properties was not detected in the received signal. The computer readable storage product may be a ROM, SRAM, EEPROM. FLASH memory, USB card, disk, diskette, DVD, or file that is transferred over an interface to the processor.

Although the description thus far describes, for illustrative purposes, CBSSA algorithms applied to WRAN or WLAN systems, the embodiments of the invention are not so limited. The CBSSA approaches of the embodiments may be applied to any application where cyclostationary based spectrum sensing is applicable.

In an embodiment, a method, comprises receiving input samples of a signal having expected predetermined properties; transforming the input samples to angular form and obtaining data samples for at least one angle vector; performing a cyclostationarity test on the at least one angle vector, the cyclostationarity test being done entirely in an angular domain; wherein the cyclostationarity test comprises testing the data samples of the at least one angle vector for a non-uniform distribution, the non-uniform distribution of the data samples of the at least one angle vector indicating cyclostationarity in the input samples; and where cyclostationarity in the input samples is determined, refraining from transmitting radio frequency signals over an air interface at a frequency corresponding to the received signal.

In another embodiment, an apparatus, comprises at least one processor; and at least one memory including computer program code, the at least one memory and the computer program code configured to, with the at least one processor, cause the apparatus at least to perform: receiving input samples of a signal having expected predetermined properties; transforming the input samples to angular form and obtaining data samples for at least one angle vector; performing a cyclostationarity test on the at least one angle vector, the cyclostationarity test being done entirely in an angular domain; wherein the cyclostationarity test comprises testing the data samples of the at least one angle vector for a non-uniform distribution, the non-uniform distribution of the samples of the at least one angle vector indicating cyclostationarity in the input samples; and where cyclostationarity in the input samples is determined, refraining from transmitting radio frequency signals over an air interface at a frequency corresponding to the received signal.

In yet another embodiment, a computer program product is provided comprising a program code stored in a tangible form in a computer readable medium, configured to cause an apparatus comprising at least one processor and at least one memory to at least perform: receiving input samples of a signal having expected predetermined properties; transforming the input samples to angular form and obtaining data samples for at least one angle vector; and performing a cyclostationarity test on the at least one angle vector, the cyclostationarity test being done entirely in an angular domain; wherein the cyclostationarity test comprises testing the data samples of the at least one angle vector for a non-uniform distribution, the non-uniform distribution of the data samples of the at least one angle vector indicating cyclostationarity in the input samples; and where cyclostationarity in the input samples is determined, refraining from transmitting radio frequency signals over an air interface at a frequency corresponding to the received signal.

In a further embodiment, the above computer program product is provided, wherein the program code stored in the computer readable medium is configured to cause the apparatus to at least perform: receiving radio frequency signals over an air interface between 54 MHz and 862 MHz, the TV "white space".

In yet another embodiment, the computer program product is provided wherein the program code stored in the computer readable medium is configured to cause the apparatus to at least perform receiving a radio frequency signal in a transceiver of a cognitive radio.

In yet another embodiment an apparatus comprises at least one processor; and at least one memory including computer program code, the at least one memory and the computer program code configured to, with the at least one processor, cause the apparatus at least to perform: performing a non-uniformity distribution test on data samples of at least one angle vector of a polar form cyclic autocorrelation function, comprising: for each of the data samples, determining from the value of the selected data sample which one of a plurality of equally sized angle sectors the sample is a member of; based on the determining, incrementing a corresponding counter, the count value of each of the counters indicating the number of data samples of the at least one angle vector that are located in a corresponding angle sector; continuing the above determining and incrementing the corresponding counter for each of the data samples in turn; and subsequently determining whether any one or more of the counters has a count greater than a predetermined upper limit threshold or whether any one or more of the counters has a count less than a predetermined lower limit threshold, and indicating a non-uniformity detection.

In yet another embodiment, a computer program product comprises a program code stored in a tangible form in a computer readable medium, configured to cause an apparatus comprising at least one processor and at least one memory to at least perform: performing a non-uniformity distribution test on data samples of at least one angle vector of a polar form cyclic autocorrelation function, comprising: for each of N data samples of the at least one angle vector, performing: for a selected one of the N data samples, determining from the value of the selected data sample which one of M equally sized angle sectors the sample is a member of, where M is an integer; based on the determining, incrementing a corresponding one of M counters, the count value of each of the M counters indicating the number of data samples that are located in the corresponding angle sector; continuing the above determining and incrementing the corresponding one of M counter steps for each of the data samples in turn until all N data samples have been evaluated; and subsequently determining whether any one or more of the M counters has a count greater than a predetermined upper limit threshold or whether any one or more of the M counters has a count less than a predetermined lower limit threshold, and indicating a non-uniformity detection based on the determining.

In yet another embodiment, an apparatus is provided, comprising: a non-uniform distribution test circuit; comprising: a selector coupled to at least a portion of a selected one of N data samples of at least one angle vector for determining which one of M equal angle sectors a selected one of the data samples corresponds to, and having an increment output for each of the M sectors; a counter coupled to each of the M increment outputs for counting each increment signal and having a count output; an upper limit comparator coupled to each of the count outputs for each of the M counters, outputting an upper limit flag when the count exceeds a predetermined upper limit threshold; a lower limit comparator coupled to each of the count outputs for each of the M counters, outputting a lower limit flag when the count is less than a predetermined lower limit threshold; a control logic circuit for presenting each of the N data samples to the selector in an indexed loop; and outputting a done signal when all N data samples have been evaluated; and a detection circuit coupled to the done signal and having inputs coupled to each of the upper limit flags and coupled to each of the lower limit flags, configured to output a non-uniformity detection signal if any one of the flags is set, responsive to the done signal.

In yet another alternative embodiment, a method comprises: receiving N data samples corresponding to at least one angle vector, where N is an integer; providing M counters corresponding to M equal sectors of the angular space, M being an integer; setting each of the M counters to an initial value of zero; performing an evaluation for each of the N data samples indexed by n from 0 to N−1, comprising: determining from at least a portion of the data sample of the at least one angle vector indexed by n which of the M sectors the data sample corresponds to; incrementing the corresponding counter; determining whether the index n=N−1, and if not, incrementing the index n; repeating the above three steps until each of the N data samples has been evaluated; following the evaluation, comparing each of the M counters to an upper limit threshold and to a lower limit threshold; and if any one of the M counters or more than one is greater than the upper limit threshold, or if any one of the M counters or more than one is less than the lower limit threshold, setting an indicator signal that indicates a non uniformity in the data samples, otherwise, resetting the indicator signal.

In yet another embodiment, a circuit comprises at least M counters each having a reset input coupled to a control logic, an increment input; and having an output indicating a count value; a multiplexer having a select input coupled to at least the most significant bits of a selected one of N data samples of at least one angle vector, and having increment outputs coupled to the increment inputs of the M counters, configured to output an increment signal to the selected counter; an upper limit comparator coupled to the output of each of the M counters, outputting a signal indicating when the corresponding count value exceeds a predetermined upper limit threshold; a lower limit comparator coupled to the output of each of the M counters, outputting a signal indicating when the count value is less than a predetermined lower limit threshold; the control logic configured to perform a loop evaluation by setting an index n from 0 to N−1, coupling a selected data sample for the at least one angle vector indexed by n to the select input of the multiplexer, and subsequently incrementing n, until n=N−1, and outputting a detection done signal when n=N−1, indicating all N data samples have been evaluated; a comparator logic having an input coupled to the output signals of each of the upper limit comparator signals and having an input coupled to the output signals of each of the lower limit comparator signals, and configured to output a detection signal indicating when any one of the comparator signals is set; and an output logic having an input coupled to the comparator logic detection signal and to the detection done signal, and having an output indicating a signal is detected when the detection done signal is set and the detection signal is set.

Although various embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, and composition of matter, or means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method, comprising:
   receiving input samples of a signal having expected predetermined properties;
   transforming the input samples to angular form and obtaining data samples corresponding to at least one angle vector;
   performing a cyclostationarity test on the at least one angle vector, the cyclostationarity test being done entirely in an angular domain;
   wherein the cyclostationarity test comprises testing the data samples of the at least one angle vector for a non-uniform distribution, the non-uniform distribution of the data samples of the at least one angle vector indicating cyclostationarity in the input samples; and where cyclostationarity in the input samples is determined, refraining from transmitting radio frequency signals over an air interface at a frequency corresponding to the received signal.

2. The method of claim 1, further comprising, based on the cyclostationarity test indicating a lack of cyclostationarity in the input samples, indicating that the signal having the expected predetermined properties was not detected at the frequency corresponding to the received signal.

3. The method of claim 1, wherein the cyclostationarity test on the data samples of the at least one angle vector is performed according to the expected predetermined properties of the signal.

4. The method of claim 3, wherein the expected predetermined properties of the signal comprise at least a predetermined cyclic frequency parameter and a predetermined lag parameter.

5. The method of claim 1, wherein testing the data samples of the at least one angle vector for non-uniform distribution further comprises:
   receiving the data samples;
   performing an evaluation for each one of the data samples, comprising:
      determining from at least a portion of the data samples which of a plurality of equal sized sectors the data sample corresponds to;
      incrementing a counter corresponding to the equal sized sector; and
      repeating the above two steps until each one of the data samples has been evaluated;
      comparing each of the counters to an upper limit threshold and to a lower limit threshold; and
      if any one of the counters or more than one is greater than the upper limit threshold, or if any one of the counters or more than one is less than the lower limit threshold, setting an indicator signal that indicates a non-uniform distribution in the data samples, otherwise, resetting the indicator signal.

6. The method of claim 1, wherein transforming the input samples to angular form and obtaining data samples corresponding to at least one angle vector further comprises:
   transforming the input samples to samples in an angular form having phase angles; and
   for each one of the input samples, computing each one of the data samples of the at least one angle vector by first summing the phase angle sample, subtracting another phase angle sample delayed by a predetermined lag parameter, and secondly summing the output of the first summing by subtracting a phase angle due to a predetermined cyclic frequency parameter.

7. The method of claim 1, wherein receiving input samples of a signal further comprises receiving radio frequency signals over an air interface at a frequency between 54 MHz and 862 MHz.

8. The method of claim 1, wherein receiving the input samples of the signal further comprises receiving the signal in a cognitive radio transceiver.

9. An apparatus, comprising:
   at least one processor; and
   at least one memory including computer program code, the at least one memory and the computer program code configured to, with the at least one processor, cause the apparatus at least to:
   receive input samples of a signal having expected predetermined properties;
   transform the input samples to angular form and obtaining data samples corresponding to at least one angle vector;
   perform a cyclostationarity test on the at least one angle vector, the cyclostationarity test being done entirely in an angular domain;
   wherein the cyclostationarity test comprises testing the data samples of the at least one angle vector for a non-uniform distribution, the non-uniform distribution of the data samples vectors indicating cyclostationarity in the input samples; and where cyclostationarity in the input samples is determined, refraining from transmitting radio frequency signals over an air interface at a frequency corresponding to the received signal.

10. The apparatus according to claim 9, wherein the at least one memory including the computer program code is further configured to, with the at least one processor, cause the apparatus to:
where a lack of cyclostationarity was determined in the cyclostationarity test, indicating that the signal having the expected predetermined properties was not detected at the frequency corresponding to the received signal.

11. The apparatus according to claim 9, wherein the at least one memory including the computer program code is further configured to, with the at least one processor, cause the apparatus to perform:
transform the input samples to samples in an angular form having phase angles; and
for each one of the input samples, compute each one of the data samples of the at least one angle vector by first summing the phase angle sample, subtracting another phase angle sample delayed by a predetermined lag parameter, and secondly summing the output of the first summing by subtracting a phase angle due to a predetermined cyclic frequency parameter.

12. The apparatus according to claim 9 wherein the at least one memory including the computer program code is further configured to, with the at least one processor, cause the apparatus to:
perform the cyclostationarity test by testing the at least one angle vector for non-uniform distribution, comprising:
receive the data samples;
perform an evaluation for each one of the data samples, comprising:
determine from at least a portion of the data sample which of a plurality of equal sized sectors the data sample corresponds to;
increment a counter corresponding to the equal sized sector; and
repeat the above two steps until each one of the data samples has been evaluated;
compare each of the counters to an upper limit threshold and to a lower limit threshold; and
if any one of the counters or more than one is greater than the upper limit threshold, or if any one of the counters or more than one is less than the lower limit threshold, set an indicator signal that indicates a non-uniform distribution in the data samples, otherwise, reset the indicator signal.

13. The apparatus according to claim 9, wherein the at least one memory including the computer program code is further configured to, with the at least one processor, cause the apparatus to:
receive radio frequency signals over an air interface at a frequency between 54 MHz and 862 MHz.

14. The apparatus according to claim 13, wherein the at least one memory including the computer program code is further configured to, with the at least one processor, cause the apparatus to:
receive a radio frequency signal over an air interface in a transceiver of a cognitive radio.

15. A computer program product comprising a program code stored in a non-transitory computer readable medium, configured to cause an apparatus comprising at least one processor and at least one memory to at least perform:
receiving input samples of a signal having expected predetermined properties;
transforming the input samples to angular form and obtaining data samples corresponding to at least one angle vector; and
performing a cyclostationarity test on the at least one angle vector, the cyclostationarity test being done entirely in an angular domain;
wherein the cyclostationarity test comprises testing the data samples of the at least one angle vector for a non-uniform distribution, the non-uniform distribution of the data samples indicating cyclostationarity in the input samples; and where cyclostationarity in the input samples is determined, refraining from transmitting radio frequency signals over an air interface at a frequency corresponding to the received signal.

16. The computer program product according to claim 15, wherein the program code stored in the non-transitory computer readable medium is configured to cause the apparatus to at least perform:
based on the cyclostationarity test indicating a lack of cyclostationarity in the input samples, indicating that the signal having the expected predetermined properties was not detected at the frequency corresponding to the received signal.

17. The computer program product according to claim 15, wherein the program code stored in the non-transitory computer readable medium is configured to cause the apparatus to at least perform:
transforming the input samples to samples in an angular form having phase angles; and
for each one of the input samples, computing each of the data samples of the at least one angle vector by first summing the phase angle sample subtracting another phase angle sample delayed by a predetermined lag parameter, and secondly summing the output of the first summing by subtracting a phase angle due to a predetermined cyclic frequency parameter.

18. The computer program product according to claim 15, wherein the program code stored in the non-transitory computer readable medium is configured to cause the apparatus to at least perform:
performing the cyclostationarity testing by testing the data samples of the at least one angle vector for non-uniform distribution, by performing:
receiving the data samples;
performing an evaluation for each one of the data samples, comprising:
determining from at least a portion of the data sample which of a plurality of equal sized sectors the data sample corresponds to;
incrementing a counter corresponding to the equal sized sector; and
repeating the above two steps until each one of the data samples has been evaluated;
comparing each of the counters to an upper limit threshold and to a lower limit threshold; and
if any one of the counters or more than one is greater than the upper limit threshold, or if any one of the counters or more than one is less than the lower limit threshold, setting an indicator signal that indicates a non-uniform distribution in the data samples, otherwise, resetting the indicator signal.

19. The computer program product according to claim 15, wherein the program code stored in the non-transitory computer readable medium is configured to cause the apparatus to at least perform:
receiving radio frequency signals over an air interface between 54 MHz and 862 MHz.

20. The computer program product according to claim 19, wherein the program code stored in the non-transitory computer readable medium is configured to cause the apparatus to at least perform: receiving a radio frequency signal in a transceiver of a cognitive radio.

* * * * *